(No Model.) 2 Sheets—Sheet 1.
W. A. BAUGH.
METHOD OF SUBDIVIDING AND DESIGNATING LAND.
No. 367,178. Patented July 26, 1887.
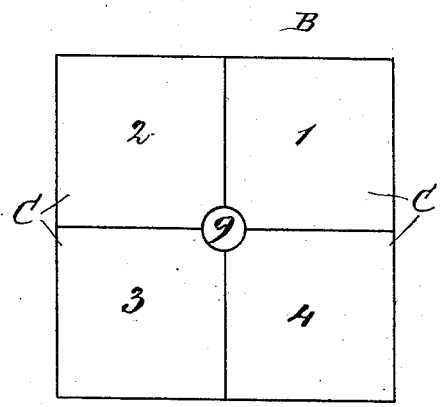
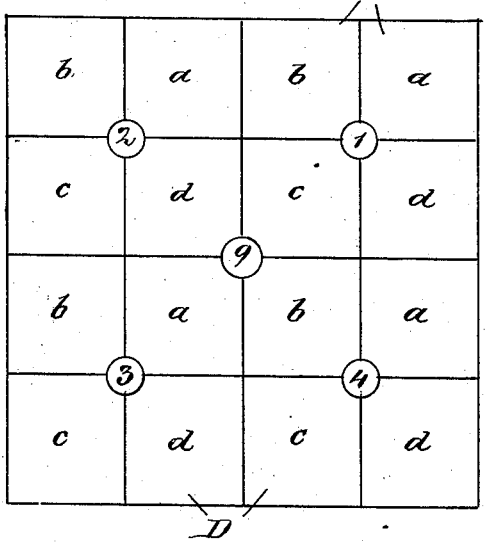
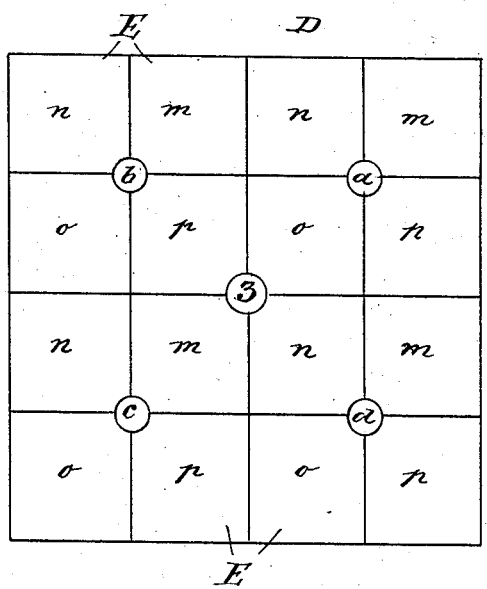
WITNESSES:
Chas. Nide
C. Sedgwick
INVENTOR:
W. A. Baugh
BY Munn & Co.
ATTORNEYS.

(No Model.)
W. A. BAUGH.
METHOD OF SUBDIVIDING AND DESIGNATING LAND.
No. 367,178. Patented July 26, 1887.
Fig: 5.
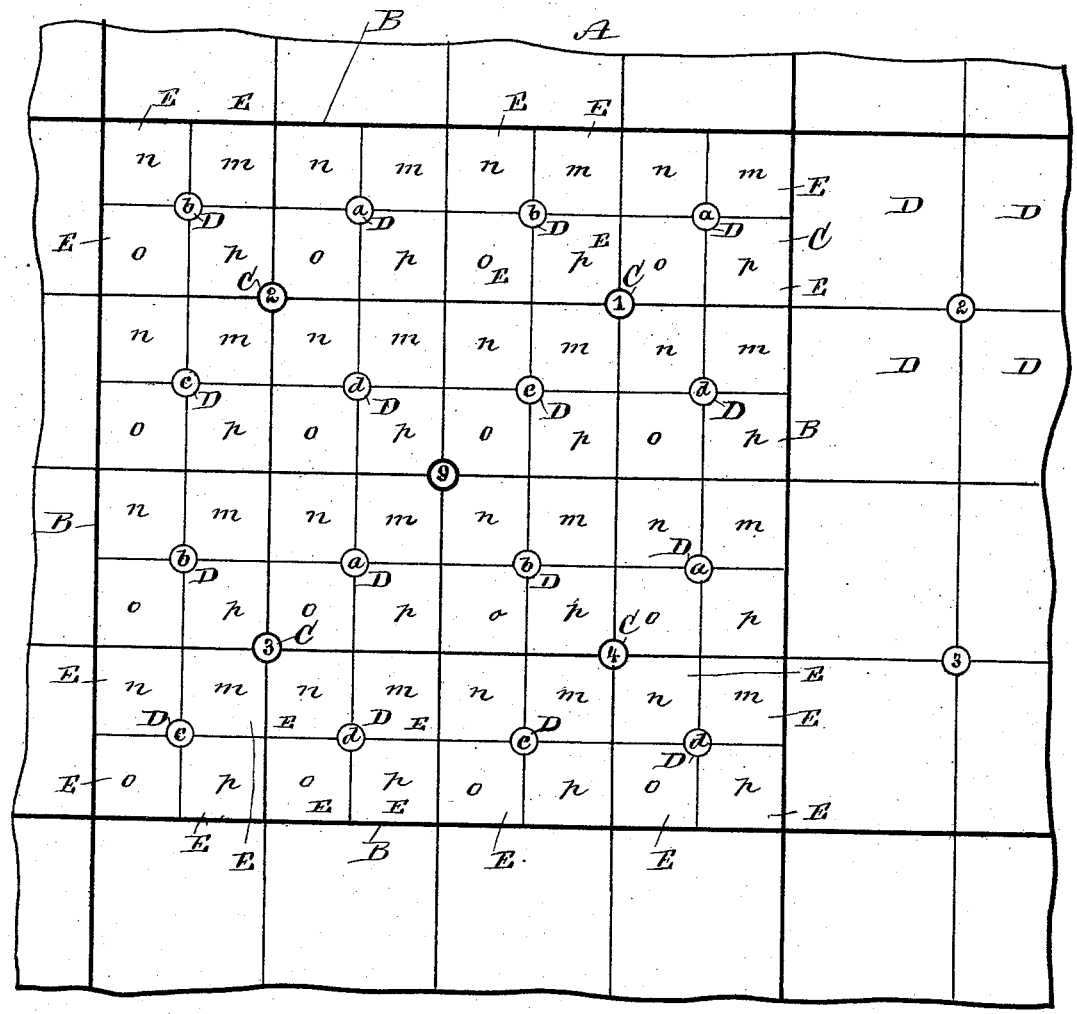
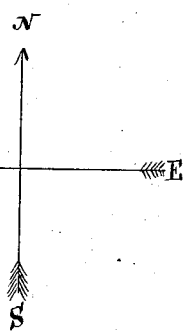
WITNESSES:
INVENTOR:

UNITED STATES PATENT OFFICE.

WILLIAM A. BAUGH, OF MELBOURNE, FLORIDA.

METHOD OF SUBDIVIDING AND DESIGNATING LAND.

SPECIFICATION forming part of Letters Patent No. 367,178, dated July 26, 1887.

Application filed January 3, 1887. Serial No. 223,221. (No model.)

*To all whom it may concern:*

Be it known that I, WILLIAM A. BAUGH, of Melbourne, in the county of Brevard and State of Florida, have invented a new and Improved Method of Subdividing and Designating Land, of which the following is a full, clear, and exact description.

The object of my invention is to provide a new and improved method for subdividing and designating land, which method is simple and avoids mistakes in designating a certain plot of ground.

The invention consists in the method of dividing a plot of land—such as a township—into thirty-six sections, numbered successively, and then dividing each section into four equal squares, each of which is divided into four equal squares, and each of the latter is again divided into four equal squares, and all the squares are designated by numerals or letters, or both.

Reference is to be had to the accompanying drawings, forming part of this specification, in which similar letters of reference indicate corresponding parts in all the figures.

Figures 1 to 5 illustrate the method of laying out and designating public lands.

Public lands are divided into townships and sections. A township is six miles square—that is, contains thirty-six square miles, or thirty-six sections numbered successively, as shown in Fig. 1, and each section contains six hundred and forty acres. Heretofore these sections have been divided into subdivisions of quarters and eighths, which have been designated by the respective marks of the compass—for instance, "N. W. ¼ of N. W. ¼ section 9." This method of subdividing land causes considerable trouble in designating a given small area or subdivision, and also requires a considerable space for designating a certain part of one section in writing, which has often to be done in public records and other documents. By my improved method I avoid all these difficulties, and can indicate with a few letters and numerals any desired plot of land.

The township A contains thirty-six square miles, as above described, and is divided into thirty-six sections, B, numbered consecutively from 1 to 36, as shown in Fig. 1. Each of these sections B is subdivided into four equal squares, C, which are marked consecutively from 1 to 4, commencing at the northeast corner, as shown in Figs. 2 and 5, in which the section 9 of the township A is selected for representation.

Each of the squares C is subdivided into four equal squares, D, which are designated in the center with the consecutive alphabetical letters *a, b, c,* and *d,* also commencing at the northeast corner, as shown in Figs. 3 and 5. Instead of using the said letters *a, b, c,* and *d* for indicating the squares D, consecutive numerals may also be employed. Each of the squares D is again subdivided into four equal squares, E, each marked in the center with the consecutive alphabetical letters *m, n, o,* and *p,* commencing at the northeast, as shown in Figs. 4 and 5. Other alphabetical letters or numerals may be substituted for the letters *m, n, o,* and *p.* Now, it will be seen that if it is desired to express, for instance, in writing the location of land-subdivision square E of the upper left corner of section 9, it would read as follows: "Section 9 2 *b n,*" or "*n* of *b,* of 2, of section 9." The same expressed in writing by the old method would read as follows: "N. W. ¼ of N. W. ¼, of N. W. ¼ of section 9."

It will also be seen that if the sections B each contain six hundred and forty acres, then each square C has one hundred and sixty acres, and each square D contains forty acres, and the last subdivision, E, contains ten acres; but each section B may contain a greater or less number of acres and the subdivided squares proportionately more or less.

Having thus described my invention, what I claim as new, and desire to secure by Letters Patent, is—

1. The herein-described method for subdividing and designating land, consisting of dividing a plot of land—such as a township—into thirty-six consecutively-numbered sections, then dividing each section into four equal squares designated by the consecutive numerals 1, 2, 3, and 4, and then dividing each of these numeral squares into four equal squares which are marked by either four consecutive alphabetical letters or by four consecutive numerals, and then again dividing each of the last-described squares into four equal squares which are designated by four consecutive alphabetical letters which have not been used to designate any of the before-described squares, substantially as shown and described.

2. The herein-described method of designating the quarter, sixteenth, and sixty-fourth parts of sections of land, which consists in designating the quarters of a section of land by a regular succession of numerals, beginning at the northeast corner, in again designating the quarters of each quarter-section of land by a regular succession of letters, beginning in the northeast corner, and in again designating the quarters of each sixteenth of a section of land by another regular series of letters not before used, beginning at the northeast corner, as set forth.

WILLIAM A. BAUGH.

Witnesses:
 CHAS. D. SWEET,
 JAMES PRITCHARD.